United States Patent
Mikami et al.

(12)

(10) Patent No.: US 6,705,775 B2
(45) Date of Patent: Mar. 16, 2004

(54) LENS-FITTED PHOTO FILM UNIT PROVIDED WITH A STOP-CHANGING MECHANISM, AND DEVICE FOR CHANGING A STOP

(75) Inventors: Yuji Mikami, Minami-Ashigara (JP); Fuminori Kawamura, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/436,072

(22) Filed: May 13, 2003

(65) Prior Publication Data

US 2003/0215227 A1 Nov. 20, 2003

(30) Foreign Application Priority Data

May 14, 2002 (JP) .................................. 2002-139193
Jul. 22, 2002 (JP) .................................. 2002-212796

(51) Int. Cl.⁷ ............................ G03B 9/00; G03B 17/02
(52) U.S. Cl. .................................. 396/458; 396/6
(58) Field of Search ...................... 396/6, 257, 458, 396/460, 493, 505

(56) References Cited

U.S. PATENT DOCUMENTS 6,493,513 B1 * 12/2002 Noguchi et al. ............ 396/257
6,612,755 B1 *  9/2003 Kamata .................... 396/458
2002/0090220 A1    7/2002 Mikami

FOREIGN PATENT DOCUMENTS

| EP | 1 096 308 A1 | 5/2001 |
| JP | 10-333287 | 12/1998 |
| JP | 2001-21940 | 1/2001 |
| JP | 2002-250956 | 9/2002 |

* cited by examiner

Primary Examiner—Russell Adams
Assistant Examiner—Arthur A Smith
(74) Attorney, Agent, or Firm—Young & Thompson

(57) ABSTRACT

A first pin to be used for rotatably supporting a shutter blade is disposed near a second pin to be used for rotatably supporting a stop-changing plate. A rotational direction of the shutter blade from a closed position to an open position is set so as to be identical with a rotational direction of the stop changing plate directing from a smaller-stop position to a larger-stop position. Rotational spaces of the shutter blade and the stop changing plate are arranged at one side of a photographic optical axis so that a protrusion of a front cover for containing them is prevented from enlarging.

17 Claims, 12 Drawing Sheets

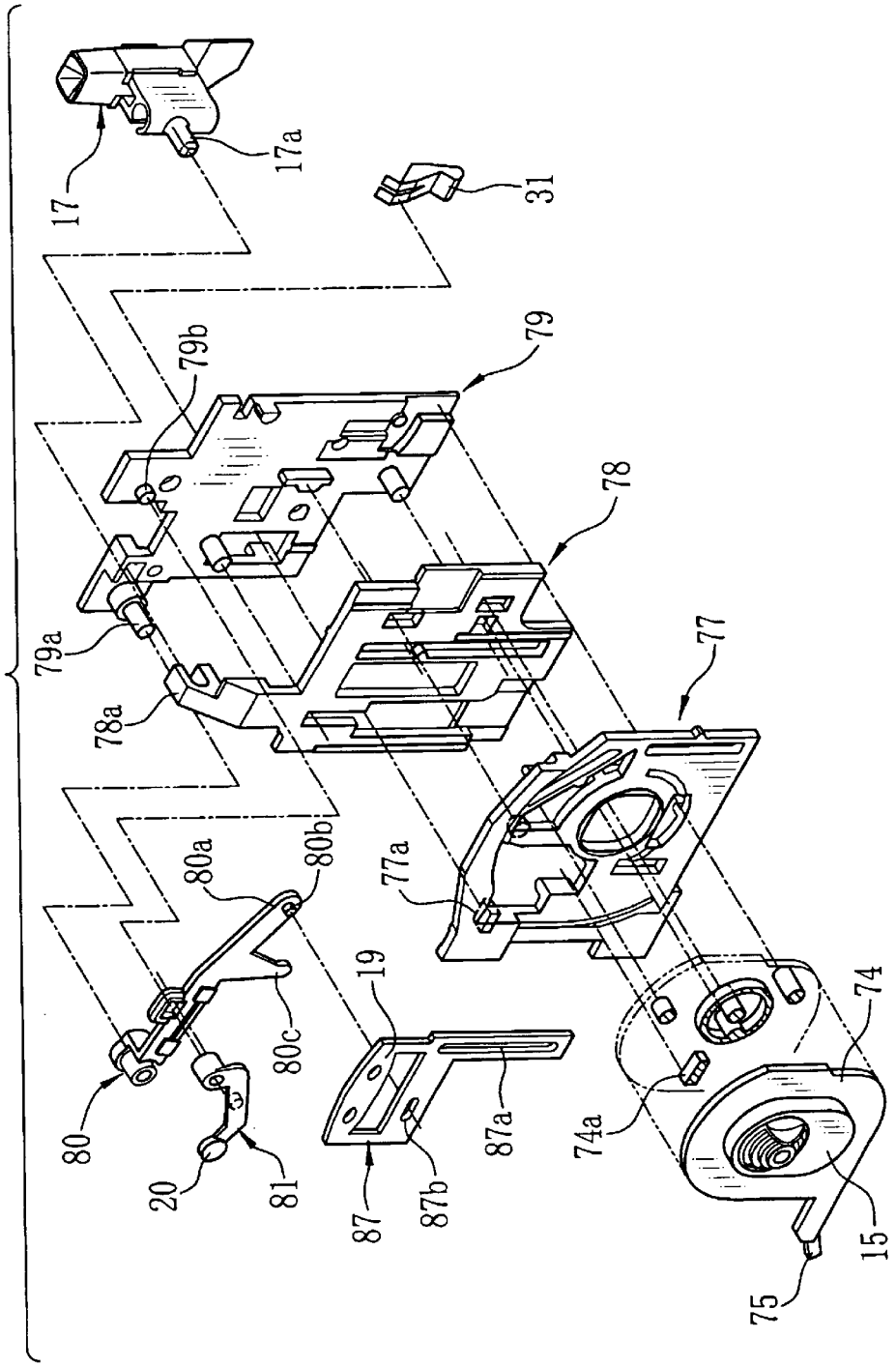

LENS-FITTED PHOTO FILM UNIT PROVIDED WITH A STOP-CHANGING MECHANISM, AND DEVICE FOR CHANGING A STOP

BACKGROUND OF THE INVENTION

1. Field of the Invention

The present invention relates to a lens-fitted photo film unit provided with a stop-changing mechanism, and further relates to a stop-changing device used for a photographic camera, an electronic still camera, a lens-fitted photo film unit and so forth.

2. Description of the Related Art

Various kinds of lens-fitted photo film units are manufactured and sold. Such a lens-fitted photo film unit includes a simple photographing mechanism and is loaded with a photo film at the time of manufacture thereof. The whole of the lens-fitted photo film unit is formed so as to have a flat shape in order to improve portability and design. However, it is necessary to secure a focal length of about 30 mm, which is fit for snapshot photographing. Thus, shortening a light-shielding box is impossible. For this reason, a protrusion is provided around a taking lens to contain peripheral parts of the taking lens inside the protrusion.

The lens-fitted photo film unit employs a shutter mechanism of a kicking type in which a single shutter blade is kicked to rotate. The protrusion has a size to be capable of containing the shutter blade and a rotational space thereof.

When the conventional lens-fitted photo film unit performs flash photographing in a dark room and in the nighttime, a main subject existing within a flash-light reaching distance may be photographed under adequate exposure. In contrast, the background beyond the flash-light reaching distance is darkly photographed because luminosity to be received is small. In order to solve this, the lens-fitted photo film unit disclosed in Japanese Patent laid-Open Publication No. 10-333287 is provided with a stop-changing mechanism for rotating a stop-changing plate formed with a smaller stop and for selectively placing the stop-changing plate at a photographic optical axis behind a taking lens. When flash photographing is performed, a stop is enlarged to increase marginal luminosity to be received.

Meanwhile, some of the various lens-fitted photo film units have a taking lens constituted of a front lens and a rear lens for the purpose of improving photographic image quality. Between the front lens and the rear lens, a stop is disposed.

When the stop-changing mechanism is built in the lens-fitted photo film unit using the stop disposed between the front and rear lenses, a space for moving the stop-changing plate is also necessary in the protrusion. If a rotational direction of the shutter blade is different from that of the stop-changing plate, the protrusion should be enlarged. In this case, portability and design are greatly constrained.

Japanese Patent Laid-Open Publication Nos. 2001-133832 and 2001-21940 disclose the lens-fitted photo film unit including the stop-changing mechanism, which changes the exposure by selectively placing the stop-changing plate at a photographic optical axis behind the taking lens.

The lens-fitted photo film unit disclosed in the former publication has a built-in photometry mechanism for automatically performing photometry in response to shutter release. Before opening and closing the shutter blade, the stop is changed in accordance with subject brightness obtained by the photometry mechanism.

Meanwhile, the lens-fitted photo film unit disclosed in the latter publication is provided with a flash switch selectively set to one of three modes of a diurnal photography mode, a diurnal synchronized-flash photography mode, and an indoor/nocturnal photography mode. Under the diurnal photography mode, a smaller stop is set to the photographic optical axis and the flashlight is prohibited. Under the diurnal synchronized-flash photography mode, the smaller stop is set to the photographic optical axis and the flashlight is emitted. Under the indoor/nocturnal photography mode, the smaller stop is evacuated from the optical axis to use a fixed larger stop and the flashlight is emitted. In this way, a flash device and the stop-changing mechanism are controlled in association with the flash switch set to the respective mode positions.

By the way, nowadays, the taking lens having a two-group two-lens structure is mainly used in view of advantageous relative to aberration correction. As to a type having this kind of the taking lens, for instance, Japanese Patent Laid-Open Publication No. 2002-250956 discloses a stop-changing device for inserting a smaller-stop plate between adjacent lenses.

The stop-changing device is provided with a front lens, a flare stopper, a spacer and a rear lens, which are arranged in order from a subject side, and the spacer constituting a fixed-stop plate is provided with a cut potion for securing a passage of the smaller-stop plate. This smaller-stop plate is inserted into a thickness of the spacer. In order to prevent an interference relative to a lens surface at the time of insertion, a circular rib is protrusively provided on the front of the rear lens. The smaller-stop plate is held by the rib and the back of the flare stopper in a direction of the photographic optical axis.

However, since the circular rib having a certain length is necessary on the front of the rear lens to hold the smaller-stop plate in the optical-axis direction, the taking lens is prevented from having a preferable formation. Further, since the smaller-stop plate moves within the thickness of the spacer in the optical-axis direction, stable high-image quality is hardly obtained.

SUMMARY OF THE INVENTION

In view of the foregoing, it is a primary object of the present invention to prevent a peripheral protrusion of a taking lens from enlarging in a lens-fitted photo film unit, which includes a stop-changing mechanism and a stop to be placed between lenses constituting the taking lens.

It is a second object of the present invention to provide a stop-changing device in which formation of lenses is free from restraint and a stop may be stably changed.

In order to achieve the above and other objects, the lens-fitted photo film unit according to the present invention comprises a shutter blade, a rotational center of which coincides with or approximates to a rotational center of a stop-changing plate. Further, a rotational direction of the shutter blade from a closed position to an open position is set so as to be identical with a rotational direction of the stop-changing plate directing from a smaller-stop position to a larger-stop position.

In a preferred embodiment, a changeover ring to be rotated in accordance with a stop changing operation is disposed around a lens barrel. In association with this changeover ring, the stop-changing plate is moved between the smaller-stop position and the larger-stop position. It is possible to utilize the rotation of the changeover ring for the purpose of changing a shutter speed.

In the lens-fitted photo film unit according to the present invention, the rotational centers of the shutter blade and the stop-changing plate are approximated to each other and the rotational directions thereof are identical. Thus, the shutter blade and the stop-changing plate can share a rotational space thereof. Owing to this, a protrusion around a taking lens has a similar size in comparison with that of a conventional lens-fitted photo film unit so that portability and design may be maintained. Further, since a stop and a shutter speed are changed by the change over ring rotating around the lens barrel, the protrusion may be downsized.

The stop-changing device according to the present invention comprises a horseshoe-shaped spacer and a stop plate, which are disposed between two lenses constituting a taking lens. The stop plate has a fixed stop and the spacer has an opening equal to or larger than the fixed stop. Thickness of the spacer and the stop plate maintains an interval of the lenses at constant. The spacer is formed with a concave portion hollowing stepwise. A stop-changing plate having a smaller stop enters the concave portion and evacuates therefrom to change the stop. The stop-changing plate is moved within a depth of the concave portion. A surface of the concave portion prevents the stop-changing plate from waggling in an optical-axis direction.

In the stop-changing device, the stop-changing plate is prevented to the utmost from contacting the lens. Further, the stop-changing plate hardly waggles in the optical-axis direction so that image quality may be prevented from deteriorating.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 13 is an exploded perspective view showing a structure of a photography-mode changing mechanism;

DETAILED DESCRIPTION OF THE PREFERRED EMBODIMENT(S)

Figure 1:
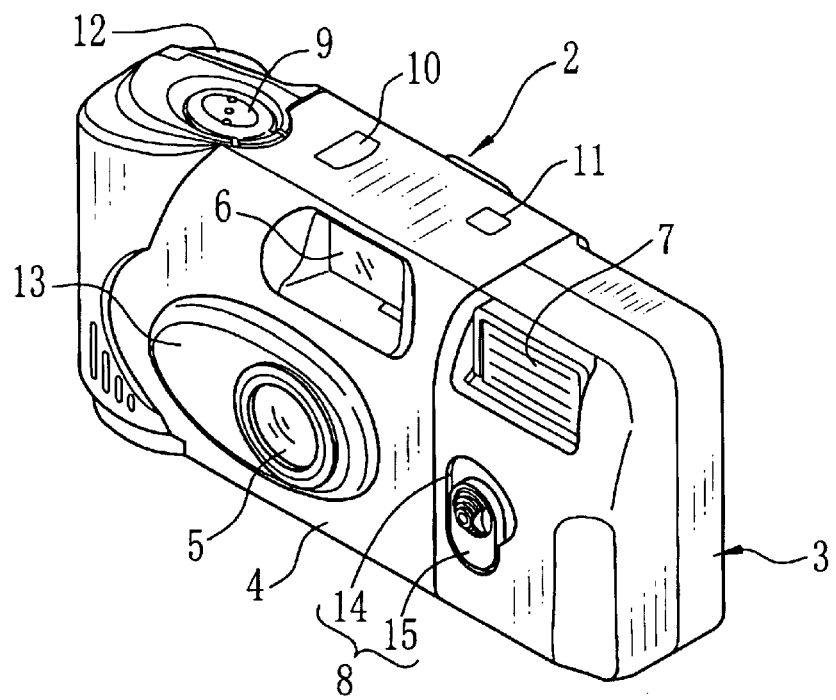
FIG. 1 is a perspective view showing a lens-fitted photo film unit according the present invention, which is in a state of a diurnal photography mode.

FIG. 1 is a perspective view showing an external shape of a lens-fitted photo film unit according to the present invention. The lens-fitted photo film unit 2 comprises a unit body 3 having various photographing mechanisms built therein, a film cartridge loaded in the unit body 3 at the time of manufacture, and a label 4 pasted so as to surround a peripheral surface of the unit body 3. The label 4 is formed with openings for exposing some portions of the unit body 3.

The front of the unit body 3 is provided with a taking lens 5, a viewfinder 6, a flash window 7, a photography-mode selector 8, and so forth. The periphery of the taking lens 5 is provided with a protrusion 13 overhanging toward the front side of the unit body 3. The taking lens 5 and peripheral parts thereof are incorporated in the protrusion 13.

An upper face of the unit body 3 is provides with a shutter button 9, a counter indicator window 10, an opening 11 for a signal member, and so forth. From a rear face of the unit body 3, a part of a winder wheel 12 emerges. The winder wheel 12 is used for winding up a photo film after photographing.

Figure 2:
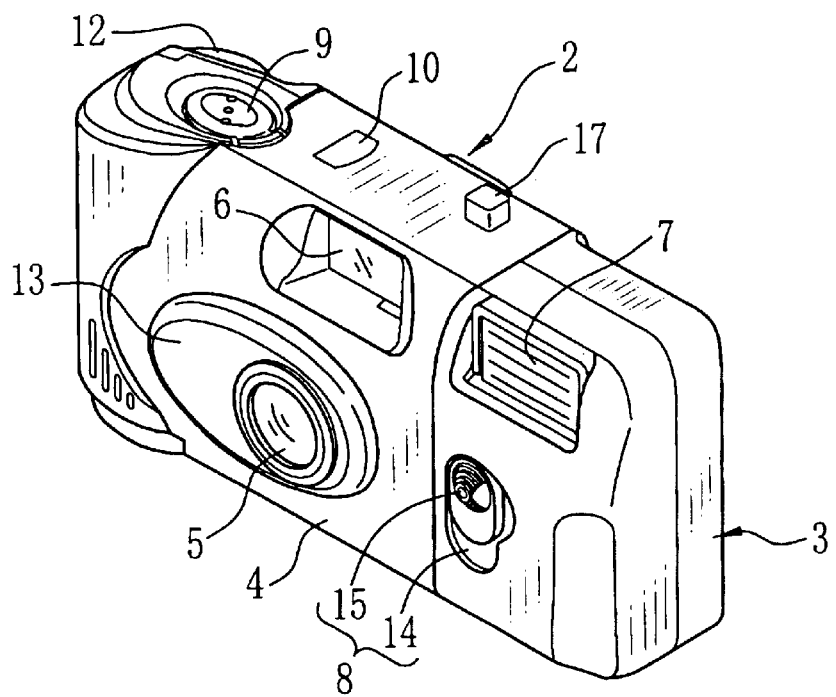
FIG. 2 is a perspective view showing the lens-fitted photo film unit, which is in a state of a diurnal synchronized-flash photography mode.
Figure 3:
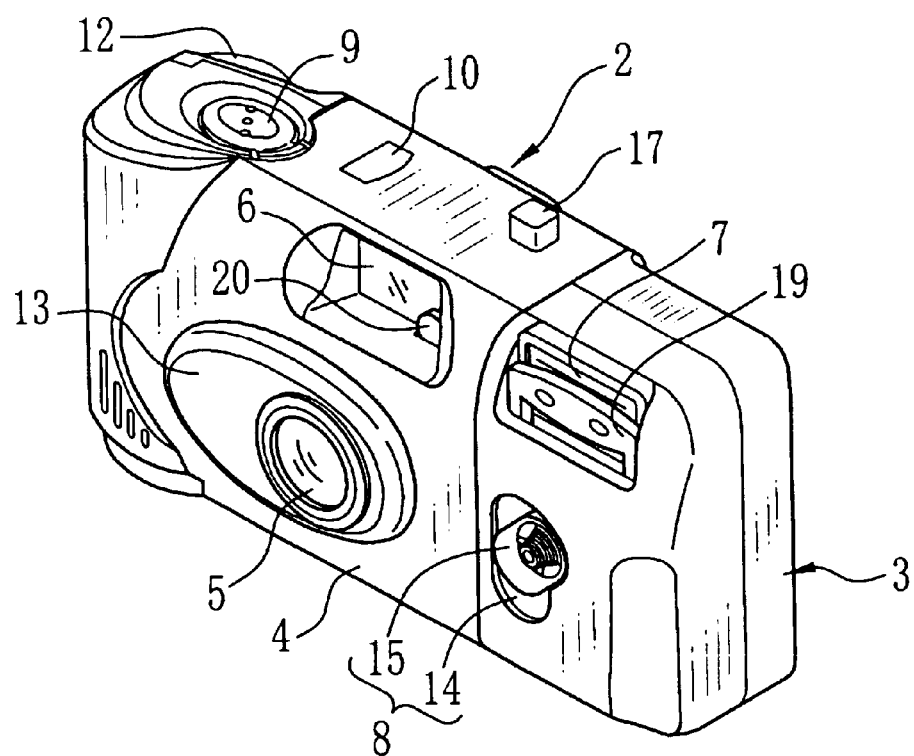
FIG. 3 is a perspective view showing the lens-fitted photo film unit, which is in a state of a nocturnal synchronized-flash photography mode.

The photography-mode selector 8 comprises an operational opening 14 and an operation member 15. The operational opening 14 is formed in the front of the unit body 3. The operation member 15 is movable inside the operational opening 14 and has an ellipse-like shape. The operation member 15 moves from a first operational position, which is a lower position of the operational opening 14, to a third operational position via a second operational position. The operation member 15 is upwardly slid from the first operational position to the second operational position, such as shown in FIG. 2. The operation member 15 is rotated in a clockwise direction from the second operational position to the third operational position, such as shown in FIG. 3.

When the operation member 15 is kept in the first operational position, the lens-fitted photo film unit 2 is set to a diurnal photography mode wherein a smaller stop and a high-speed shutter are adopted and a flash is turned off. Meanwhile, when the operation member 15 is kept in the second operational position, the lens-fitted photo film unit 2 is set to a diurnal synchronized-flash photography mode wherein the smaller stop and the high-speed shutter are adopted and the flash is turned on. Under the diurnal synchronized-flash photography mode, a signal member 17, which is a light guide, projects from the upper face of the lens-fitted photo film unit 2. The signal member 17 guides alight of a light-emitting element, which emits the light when flash charge is completed, to the outside of the unit body 3 to notify that photographic preparation is completed.

When the operation member 15 is kept in the third operational position, a nocturnal synchronized-flash photography mode is set so as to turn on the flash and so as to adopt a larger stop and a low-speed shutter. Under the nocturnal synchronized-flash photography mode, a light-reducing member 19 having a plate shape is moved from a lower portion to the front of the flash window 7 to reduce an amount of the flash light. Meanwhile, an indication member 20 having a disk shape projects in front of the viewfinder 6. The indication member 20 is observed inside the viewfinder 6 to notify a photographer that the lens-fitted photo film unit 2 is set to the nocturnal synchronized-flash photography mode.

Figure 4:
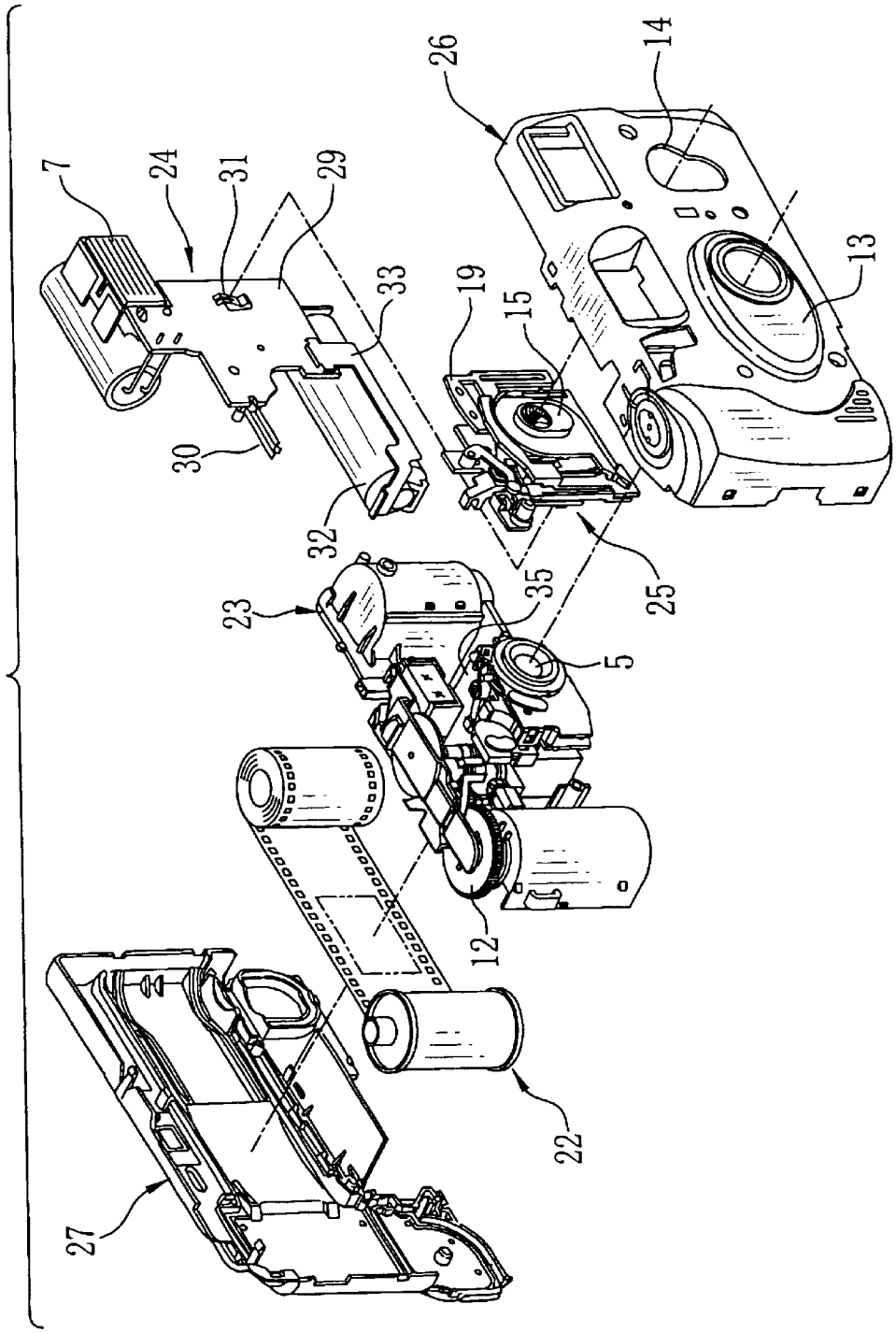
FIG. 4 is an exploded perspective view showing a structure of the lens-fitted photo film unit.

FIG. 4 is an exploded perspective view showing a structure of the unit body 3. The unit body 3 comprises a body base 23, a flash unit 24, a mode-changing mechanism 25, a front cover 26, and a rear cover 27. The body base 23 is loaded with a 135-type film cartridge 22. The flash unit 24 is attached to the front of the body base 23. The mode-changing mechanism 25 changes the photography mode. The front cover 26 and the rear cover 27 are attached to the front and the rear of the body base 23 respectively. The protrusion 13 is integrally formed with a forehead of the front cover 26.

The flash unit 24 is constituted of a printed circuit board 29 to which various electric parts are attached to form a flash circuit, and a flash-emitting portion comprising a discharge tube, a reflector, a diffusion plate, and so forth. Further, to the printed circuit board 29, are attached a synchro switch 30, a metal segment 31, a battery segment 33, and so forth. The synchro switch 30 is turned on in association with shutter release to emit the flashlight. The metal segment 31 constitutes a charging switch to be turned on and off by moving the operation member 15 of the photography-mode selector 8. The battery segment 33 connects a battery 32 to the flash circuit.

The front-center portion of the body base 23 is provided with a light-shielding box 35 around which are disposed a shutter charging mechanism, a shutter releasing mechanism, a film winding mechanism, a film-advance stopping mechanism, a film counting mechanism, a stop-changing mechanism, a shutter-speed changing mechanism, a photographic optical system, a viewfinder optical system, and so forth.

Figure 5:
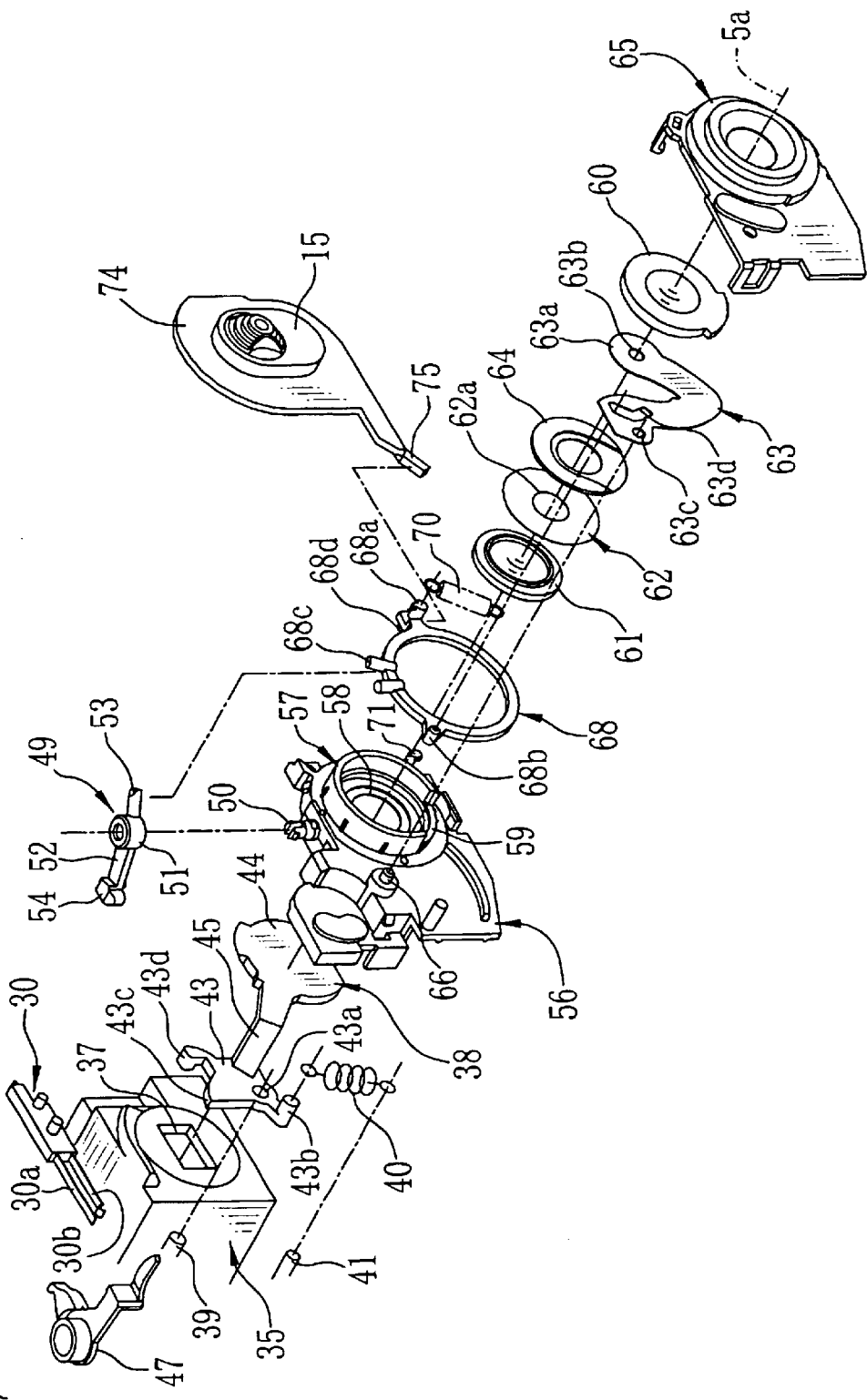
FIG. 5 is an exploded perspective view showing a structure of a stop and a shutter-speed changing mechanism.

FIG. 5 is an exploded perspective view showing a structure of the shutter releasing mechanism, the stop-changing mechanism, the shutter-speed changing mechanism, and the photographic optical system, which are disposed around the light-shielding box 35. The front of the light-shielding box 35 is formed with an exposure aperture 37 having a rectangular shape. Pins 39 and 41 are disposed at a lateral side of the light-shielding box 35. The pin 39 supports a shutter blade 38 swingably. One end of a spring 40 is put on the pin 41.

The shutter blade 38 constituting the shutter releasing mechanism comprises a base portion 43, a blade portion 44, and a connection portion 45. The base portion 43 is formed with an opening 43a into which the pin 39 is inserted. Meanwhile, the blade portion 44 is disposed in front of the exposure aperture 37 to open and close it. The connection portion 45 connects the base portion 43 and the blade portion 44. The base portion 43 is provided with a pin 43b, a ledge 43c and a synchro projection 43d. The other end of the spring 40 is put on the pin 43b. The ledge 43c is kicked by a shutter driving lever 47. The synchro projection 43d actuates the synchro switch 30 of the flash unit 24. The shutter blade 38 is urged by the spring 40 and is kept in a closed position for covering the exposure aperture 37.

The shutter driving lever 47 is one of parts constituting the shutter releasing mechanism and is rotated to a charge position by the shutter charging mechanism in a clockwise direction in the drawing. When the shutter is released, the shutter driving lever 47 is rotated toward a release position in a counterclockwise direction in the drawing. At that time, the ledge 43c of the shutter blade 38 is kicked. The shutter blade 38 kicked by the shutter driving lever 47 is rotated against the spring 40 toward an open position in the clockwise direction. Then, the shutter blade 38 abuts on a stopper pin 56a (see FIG. 9) formed inside a lens holder 56 and is returned to the closed position by means of the spring 40.

When the shutter blade 38 is rotated to the open position, the synchro projection 43d presses an upper metal segment (first metal segment) 30a to contact it with a lower metal segment (second metal segment) 30b. Upon turning on the synchro switch 30 by contacting the couple of the metal segments 30a and 30b, the flash-emitting portion of the flash unit 24 emits the flashlight.

An upper portion of the lens holder 56 is formed with a pin 50 for rotatably supporting a stop lever 49. This stop lever 49 comprises a boss 51 to be supported by the pin 50, two arms 52 and 53 projecting from the side of the boss 51, and a pad 54 formed at the top of the arm 52.

Figure 6:
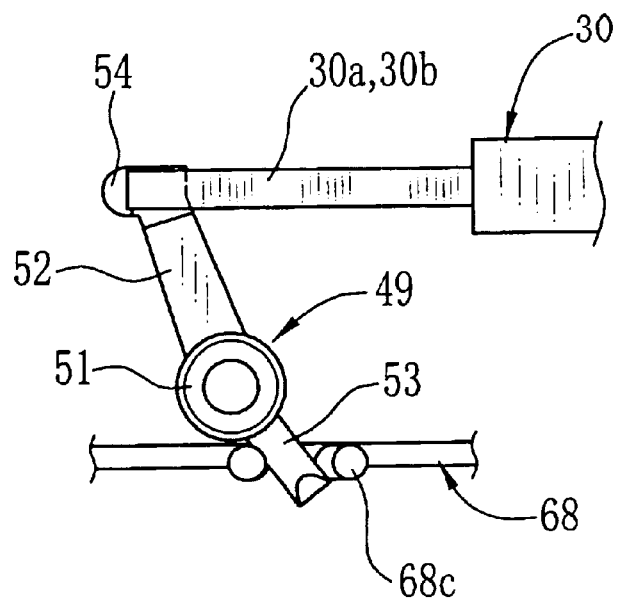
FIG. 6 is an explanatory illustration showing a high-speed shutter position of a stop lever.
Figure 7:
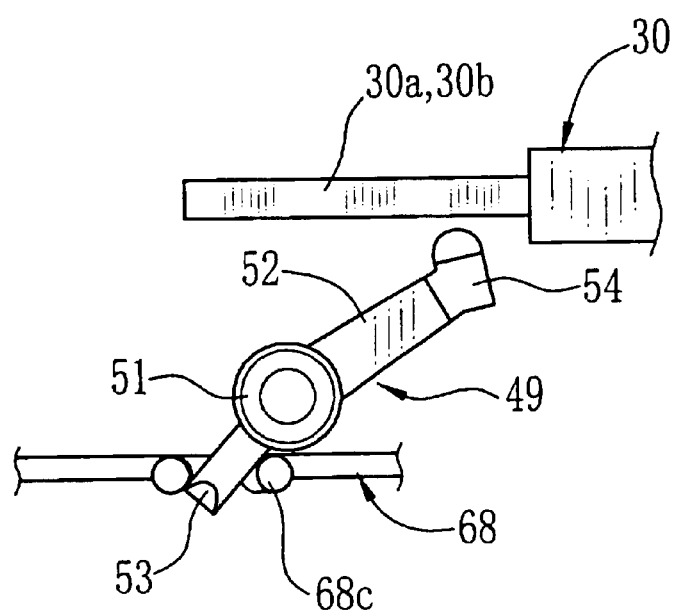
FIG. 7 is an explanatory illustration showing a low-speed shutter position of the stop lever.

The stop lever 49 is rotated between a high-speed shutter position shown in FIG. 6 and a low-speed shutter position shown in FIG. 7. In the high-speed shutter position, the pad 54 is placed under a free end of the lower metal segment 30b of the synchro switch 30 to abut thereon. In the low-speed shutter position, the pad 54 is evacuated from the under portion of the lower metal segment 30b.

Figure 8:
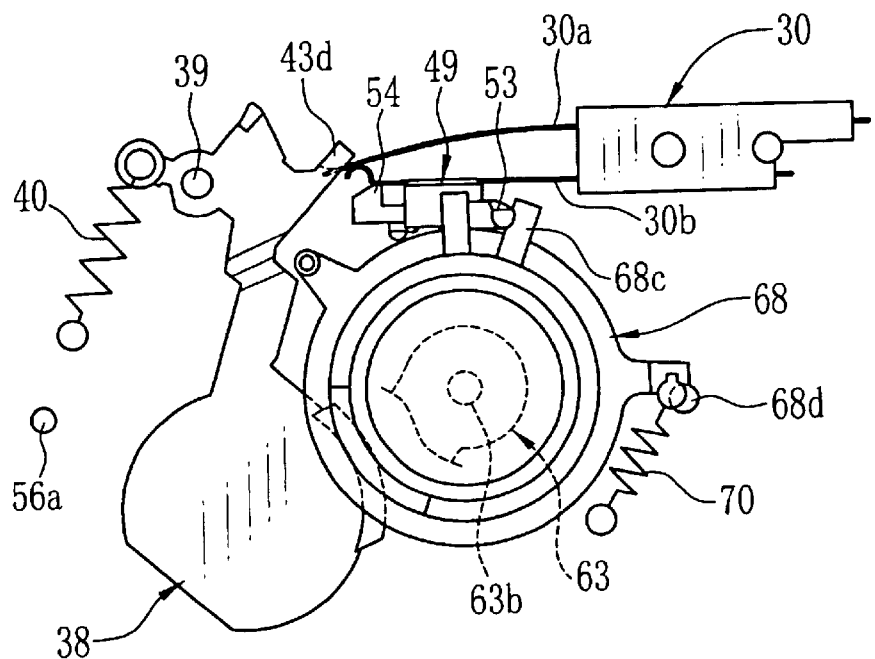
FIG. 8 is an explanatory illustration showing shutter release in a high-speed shutter state.

When the shutter is released in the state that the pad 54 of the stop lever 49 is kept in the high-speed shutter position as shown in FIG. 8, the upper metal segment 30a of the synchro switch 30 pressed by the synchro projection 43d of the shutter blade 38 comes into contact with the lower metal segment 30b to emit the flashlight. The lower metal segment 30b abuts on the pad 54 so that the shutter blade 38 is prevented from rotating further. Owing to this, the shutter blade 38 is returned to the closed position in a shorter time. As to this high-speed shutter, it is possible to obtain a shutter speed of 1/120 sec., for instance.

The synchro switch 30 is turned on between the synchro projection 43d and the pad 54. Thus, it is possible to surely emit the flashlight when the photographic aperture 58 is fully opened. Further, exposure may be properly performed at the moment of the synchro-flash photography.

Figure 9:
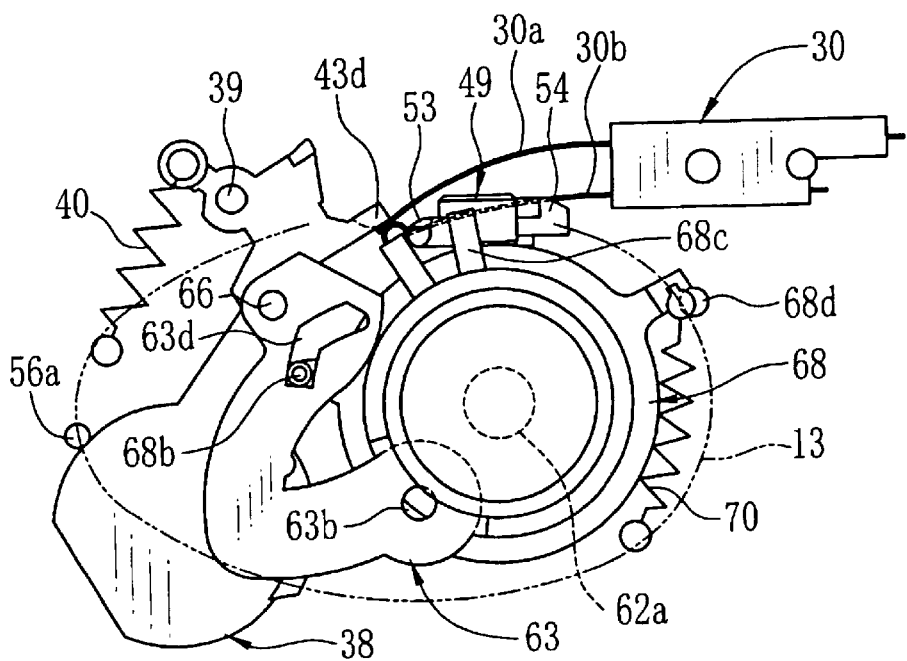
FIG. 9 is an explanatory illustration showing shutter release in a low-speed shutter state.

In the meantime, when the pad 54 of the stop lever 49 is kept in the low-speed shutter position as shown in FIG. 9, the shutter blade 38 is largely rotated to the open position. This is caused because the metal segment 30b is elastically transformed. As a result, it takes a longer time to return the shutter blade 38 to the closed position so that the shutter speed becomes slow. As to this low-speed shutter, it is possible to obtain a shutter speed of 1/45 sec., for instance.

Incidentally, in order to make the free end of the lower metal segment 30b abut on the pad 54, it is preferable to slightly curve this free end downward. In doing so, when the pad 54 is placed under the free end, the lower metal segment 30b is somewhat raised by the pad 54. Moreover, a slope may be formed on the base of the pin 50 supporting the stop lever 49. In doing so, as the pad 54 approaches the under portion of the lower metal segment 30b, the pad 54 moves in a vertical direction to abut on the lower metal segment 30b.

The lens holder 56 having a plate-like shape is disposed in front of the light-shielding box 35. A front-central portion of the lens holder 56 is formed with a lens barrel 57 having a cylindrical shape. The photographic aperture 58 is formed in the lens barrel 57, a part of which is provided with a cut portion 59. The lens barrel 57 contains a first lens (front lens) 60 and a second lens (rear lens) 61, which constitute the taking lens 5. A larger-stop plate 62, a stop-changing plate 63 and a spacer 64 are disposed between the first lens 60 and the second lens 61. The larger-stop plate 62 constitutes the stop-changing mechanism. The spacer 64 secures a space for inserting the stop-changing plate 63. The larger-stop plate 62 is formed from a circular thin plate and is formed with a larger stop 62a formed at a central portion thereof.

A lens holding plate 65 is attached to the front of the lens holder 56. The lens holding plate 65 holds the parts of the taking lens 5 and so forth, which are contained in the lens barrel 57, and a switch ring 68 disposed around the lens barrel 57 so that these components are prevented from unfastening.

The stop-changing plate 63 is formed from a thin plate and has a V-like shape. One end of the stop-changing plate 63 is provided with a smaller-stop portion 63a for covering the larger stop 62a. The smaller-stop portion 63a is formed with a smaller stop 63b. The other end of the stop-changing plate 63 is formed with a circular hole 63c and a curved ellipse hole 63d. A pin 66 formed near the lens barrel 57 of the lens holder 56 is inserted into the circular hole 63c so that the stop-changing plate 63 becomes swingable.

The stop-changing plate 63 is moved between a smaller-stop position where the smaller stop 63b is placed at a photographic optical axis, and a larger-stop position where the smaller-stop portion 63a is evacuated through the cut portion 59 to the outside of the lens barrel 57 to expose the larger stop 62a.

A changeover ring 68 is rotatably disposed around the lens barrel 57. The changeover ring 68 is provided with a spring-hang pin 68a, a link pin 68b, a pair of bite pins 68c, and a driven pin 68d. One end of a spring 70 is put on the spring-hang pin 68a. The link pin 68b is inserted into the ellipse hole 63d of the stop-changing plate 63. The other arm 53 of the stop lever 49 is interposed between the bite pins 68c. The driven pin 68d projects backward and is pressed by the mode-changing mechanism.

The other end of the spring 70 is put on a pin 71 formed on a front-lower portion of the lens holder 56 to urge the changeover ring 68 in a clockwise direction in the drawing. Incidentally, the changeover ring 68 urged by the spring 70 is kept in a predetermined position by means of the stop-changing plate 63.

The operation member 15 is integrally formed with a plate portion 74 having a disk-like shape. The plate portion 74 is provided with a press lever 75 projecting in a horizontal direction. Upon rotating the operation member 15 from the second operational position to the third operational position, the press lever 75 of the plate portion 74 pushes the driven pin 68d of the changeover ring 68 upwardly. In virtue of this, the changeover ring 68 is rotated in a counterclockwise direction in the drawing.

Figure 10:
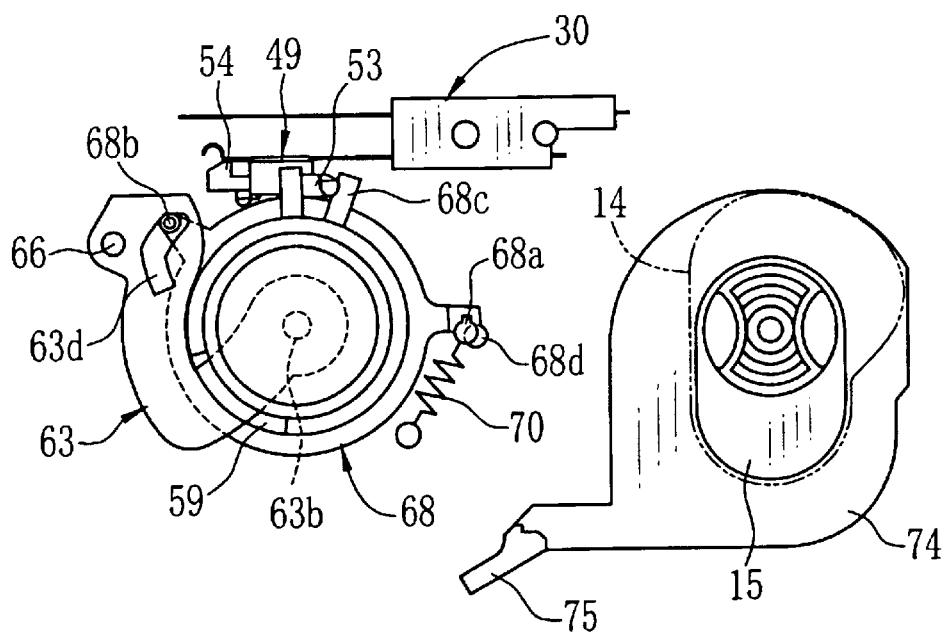
FIG. 10 is an explanatory illustration showing the stop and the shutter-speed changing mechanism under the diurnal photography mode.
Figure 11:
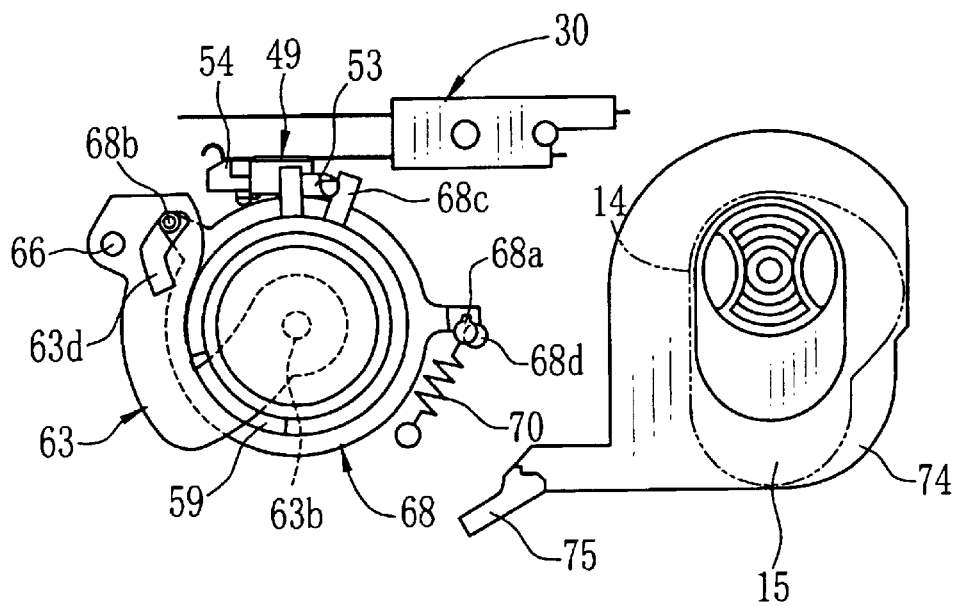
FIG. 11 is an explanatory illustration showing the stop and the shutter-speed changing mechanism under the diurnal synchronized-flash photography mode.

FIGS. 10 and 11 show states of the changeover ring 68 set to the diurnal photography mode and the diurnal synchronized-flash photography mode respectively. When the operation member 15 is kept in the first and second operational positions, the press lever 75 of the operation member 15 is prevented from coming into contact with the driven pin 68d of the changeover ring 68. Thus, the changeover ring 68 is kept by the stop-changing plate 63 at an initial position.

When the changeover ring 68 is kept in the initial position, the smaller-stop portion 63a of the stop-changing plate 63 is inserted into the lens barrel 57 by means of the link pin 68b. Accordingly, the smaller-stop portion 63a covers the larger stop 62a to set a smaller-stop state. Meanwhile, the pair of the bite pins 68c keeps the stop lever 49 in the high-speed shutter position.

Figure 12:
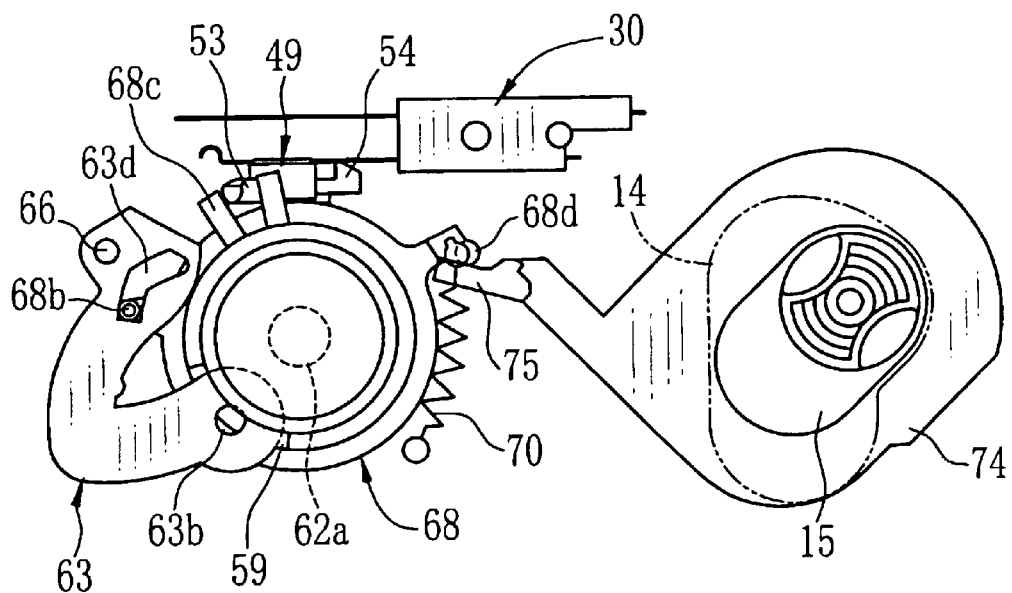
FIG. 12 is an explanatory illustration showing the stop and the shutter-speed changing mechanism under the nocturnal synchronized-flash photography mode.

Upon rotating the operation member 15 from the second operational position to the third operational position such as shown in FIG. 12, the press lever 75 pushes the driven pin 68d upwardly to rotate the changeover ring 68 in the counterclockwise direction in the drawing. Owing to this rotation of the changeover ring 68, the stop-changing plate 63 pushed by the link pin 68b is rotated in the clockwise direction so that the smaller-stop portion 63a is evacuated from the optical axis to set a larger-stop state. Moreover, the pair of the bite pins 68c rotates the stop lever 49 to set the pad 54 to the low-speed shutter position.

As shown in FIG. 9, with respect to the shutter blade 38 and the stop-changing plate 63, their rotational centers viewed from the front of the lens-fitted photo film unit are proximally positioned. Further, their rotational directions are the same, and their movement ranges are substantially equal to each other. Since the stop-changing plate 63 is rotated by the changeover ring 68 rotating around the Lens barrel 57, the protrusion 13 is sufficient to have a size substantially identical with that of the conventional lens-fitted photo film unit provided with a rotational space of the shutter blade 38. Thus, portability and design of the lens-fitted photo film unit are prevented from deteriorating.

FIG. 13 is an exploded perspective view showing a structure of the mode-changing mechanism 25. The mode-changing mechanism 25 comprises the operation member 15, a bearing plate 77, a slide plate 78, a receiver plate 79, a light-reducing lever 80, a light-reducing plate 87, and an indication lever 81.

Figure 14:
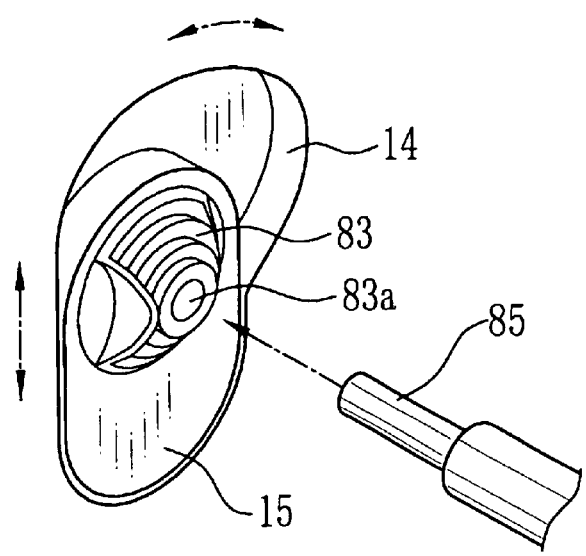
FIG. 14 is an explanatory illustration showing an actuating method for an operation member in examination of the photography-mode changing mechanism.

As shown in FIG. 14, the front of the operation member 15 is formed with a fingered portion 83 having a cone-like shape for putting a finger at the time of operation. The fingered portion 83 is formed with steps to improve engagement of the finger. Further, the top of the fingered portion 83 is formed with a hole 83a into which a tool of an examining apparatus is inserted. When the mode-changing mechanism is examined after completing the lens-fitted photo film unit 2, the tool 85 of the examining apparatus is inserted into the hole 83a of the fingered portion 83. The tool 85 vertically slides and rotates the operation member 15 to confirm the operation of the mode-changing mechanism 25.

The receiver plate 79 is attached to the front of the printed circuit board 29 of the flash unit 24 and holds the slide plate 78 and the bearing plate 77 in a vertically slidable manner. The operation member 15 is rotatably held by the bearing plate 77. Upon sliding the operation member 15 from the first operational position to the second rotational position, both of the bearing plate 77 and the slide plate 78 are slid upward. Upon rotating the operation member 15 from the second operational position to the third operational position, the slide plate 78 is further slid upward without moving the bearing plate 77.

The slide plate 78 is provided with an engagement portion 78a for engaging with an engagement pin 17a of the signal member 17. When the operation member 15 is kept in the first operational position, the signal member 17 is contained in the unit body 3. Upon moving the operation member 15 to the second operational position or the third operational position, the signal member 17 projects from the upper face of the unit body 3 in association with the slide plate 78.

The back of the bearing plate 77 is provided with a pressure segment 77a, which presses the metal segment 31 of the charge switch of the flash unit 24 through the slide plate 78 and the receiver plate 79 when the operation member 15 is kept in the second and third operational positions.

The receiver plate 79 is provided with pins 79a and 79b to which the light-reducing lever 80 and the indication lever 81 are rotatably attached. The light-reducing plate 87 is formed with a vertical ellipse hole 87a and a horizontal ellipse hole 87b, which are positioned under the light-reducing member 19. Into the vertical ellipse hole 87a, are inserted a plurality of pins formed on an inner wall of the front cover 26 and under the flash emitting portion. Owing to the pins, the light-reducing plate 87 becomes slidable inside the front cover 26 in the vertical direction. Into the horizontal ellipse hole 87b, is inserted a link pin 80b formed on an end 80a of the light-reducing lever 80.

When the operation member 15 is moved to the third operational position, a lift segment 80c is pushed by a projection 74a integrally formed with the plate portion 74 so that the light-reducing lever 80 is rotated in the counter-clockwise direction in the drawing. At this time, the link pin 80b raises the light-reducing plate 87 to place the right-reducing member 19 in front of the flash window 7. The indication lever 81 is rotated in the clockwise direction in association with the rotation of the light-reducing lever 80 to place the indication member 20 in front of the viewfinder 6.

Successively, an operation of this embodiment is described below. When the lens-fitted photo film unit 2 is set under the diurnal photography mode, the operation member 15 of the photography-mode selector 8 is slid to the first operational position occupying the lower portion of the opening 14, such as shown in FIG. 1.

Under the diurnal photography mode, the changeover ring 68 is urged by the spring 70 and is kept in the initial position, such as shown in FIG. 10. When the changeover ring 68 is kept in the initial position, the stop-changing plate 63 is set to the smaller-stop position and the stop lever 49 is set to the high-speed shutter position, such as shown in FIG. 6.

Moreover, in the diurnal photography mode, all of the plate portion 74, the bearing plate 77 and the slide plate 78 are kept in the lower position so that the metal segment 31 of the flash unit 24 is not pressed. Thus, the signal member 17 does not project from the upper face of the unit body 3. Further, the projection 74a of the plate portion 74 does not abut on the lift segment 80c of the light-reducing lever 80 so that the light-reducing member 19 and the indication member 20 are not exposed in front of the lens-fitted photo film unit 2.

When a picture is taken under the diurnal photography mode, the flashlight is not emitted. Further, the smaller-stop state is set and the stop lever 49 interrupts the rotation of the shutter blade 38 on its way to hasten the shutter speed. Owing to this, it is possible to perform photographing with proper exposure relative to the photography of diurnal outdoor having high brightness.

As shown in FIG. 2, upon sliding the operation member 15 of the photography-mode selector 8 to the second operational position occupying the upper portion of the opening 14, the lens-fitted photo film unit 2 is set to the diurnal synchronized-flash photography mode.

Also under the diurnal synchronized-flash photography mode, the changeover ring 68 is kept in the initial position such as shown in FIG. 11. Thus, the smaller-stop state and the high-speed shutter state are set similarly to the diurnal photography mode.

The plate portion 74, the bearing plate 77 and the slide plate 78 are upwardly slid in the diurnal synchronized-flash photography mode. The metal segment 31 of the flash unit 24 is pressed and turned on by the pressure segment 77a of the bearing plate 77 so that flash charging is performed in the flash unit 24.

The slide plate 78 pushes the signal member 17 to project it from the upper face of the unit body 3. When the flash charging is completed, a light emitting element provided on the flash unit 24 is turned on or is blinked. Rays of the light emitting element are guided by the signal member 17 and are emitted to the outside of the unit body 3.

Also under the diurnal synchronized-flash photography mode, the projection 74a of the plate portion 74 does not abut on the lift segment 80c of the light-reducing lever 80. Thus, the light-reducing member 19 and the indication member 20 are maintained in the non-display state.

When a picture is taken under the diurnal synchronized-flash photography mode, the flashlight is emitted. Since the smaller-stop state and the high-speed shutter state are set, it is possible to perform photographing with proper exposure relative to the synchronized-flash photography of diurnal outdoor having high brightness.

As shown in FIG. 3, upon rotating the operation member 15 of the photography-mode selector 8 from the second operational position to the third operational position, the lens-fitted photo film unit 2 is set to the nocturnal synchronized-flash photography mode.

In the nocturnal synchronized-flash photography mode, the press lever 75 of the plate portion 74 pushes the driven pin 68d of the changeover ring 68 upwardly, such as shown in FIG. 12. The changeover ring 68 is rotated from the initial position in the counterclockwise direction against the urging force of the spring 70. In association with the rotation of the changeover ring 68, the stop-changing plate 63 is rotated to the larger-stop position to adopt the larger stop 62a disposed at the photographic optical axis. Meanwhile, the stop lever 49 is kept in the low-speed shutter position, such as shown in FIG. 7.

In the nocturnal synchronized-flash photography mode, the plate portion 74 is rotated together with the operation member 15 to move the slide plate 78 further upwardly in comparison with the diurnal synchronized-flash photography mode. Although the signal member 17 is also moved upwardly by a little, a function for indicating the completion of charging is not affected. Incidentally, the bearing plate 77 is kept in the same position with the diurnal synchronized-flash photography mode so that the charge switch of the flash unit 24 is maintained in the turned-on state.

In the nocturnal synchronized-flash photography mode, the lift segment 80c is pushed by the projection 74a of the plate portion 74. Accordingly, the light-reducing lever 80 is rotated in the counterclockwise direction in the drawing to raise the right-reducing plate 87 via the link pin 80b. Thus, the light-reducing member 19 is placed in front of the flash window 7. Meanwhile, the indication lever 81 is rotated in association with the rotation of the light-reducing lever 80 to place the indication member 20 in front of the viewfinder 6. The indication member 20 notifies a photographer of the nocturnal synchronized-flash photography mode when the photographer looks into the viewfinder 6.

When a picture is taken under the nocturnal synchronized-flash photography mode, the flashlight is emitted. The flashlight, however, passes through the light-reducing member 19 so that an amount of the flashlight reduces. Since the larger stop and the low-speed shutter state are set, peripheral light of a subject to be taken increases. Thus, the subject and a peripheral image thereof may be photographed in good balance without causing an overexposure when the picture is taken in the night-time and inside a room.

In the above embodiment, the larger-stop plate is disposed between the first lens and the second lens. The larger-stop plate, however, maybe disposed behind the second lens. Further, in the above embodiment, the rotational centers of the shutter blade and the stop-changing plate are approximated to each other. However, these rotational centers may coincide.

Next, another embodiment according to the present invention is described below. Such as shown in FIG. 5, the taking lens 5 has a two-group two-lens structure of the first and second lenses 60 and 61 (hereinafter, called as front and rear lenses respectively). In this embodiment, an object side of the front lens 60 is a convex meniscus lens. Further, each surface of the rear lens 61 is a convex lens. In this embodiment, an interval between the lenses 60 and 61 is maintained by the stop plate 62 and another spacer 64 shown in FIG. 15. The spacer 64 and the stop plate 62 are arranged in this order from a subject side. The stop plate 62 is formed with the fixed larger stop 62*a*.

Figure 15:
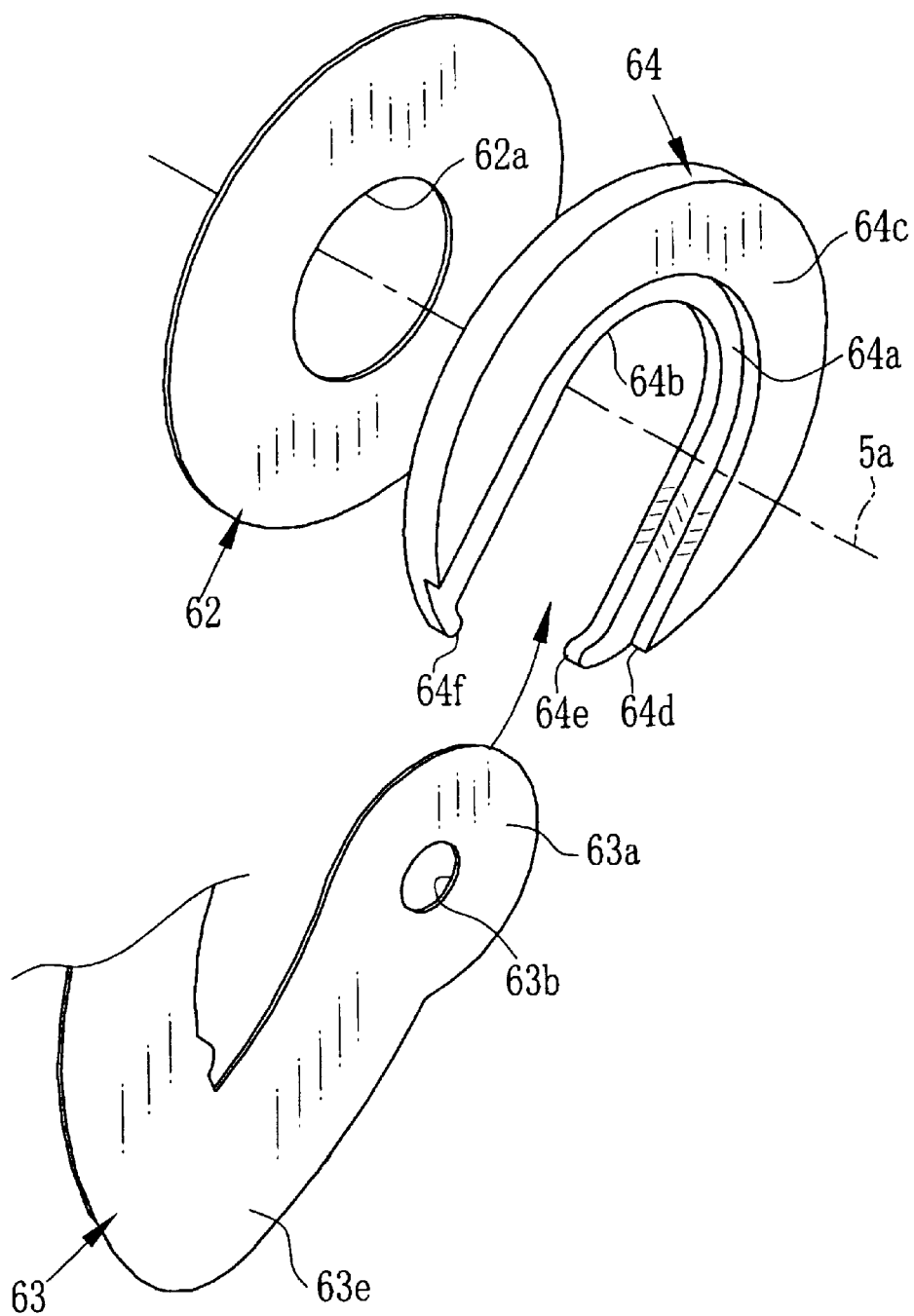
FIG. 15 is a perspective view showing a spacer and a stop-changing plate.

As shown in FIG. 15, the front of the spacer 64 is formed with a concave portion 64*a* hollowed stepwise. The concave portion 64*a* is formed with an opening 64*b* having a diameter equal to or larger than the fixed stop 62*a*. The opening 64*b* is elliptically cut toward the periphery of the spacer 64 in an identical width. A thick portion 64*c* surrounding the concave portion 64*a* is formed with a gap 64*d* partially cut off. The end portion 63*a* of the stop-changing plate 63 enters the concave portion 64*a* through the gap 54*d*. Incidentally, as described above, the lens barrel 57 is formed with the cut portion 59 through which the end portion 63*a* of the stop-changing plate 63 moves (see FIG. 5). The spacer 64 having a horseshoe shape is inserted into the lens barrel 57 so as to adjust the gap 64*d* to the cut portion 59.

The stop-changing plate 63 has a thickness thinner than a depth of the concave portion 64*a*. The stop-changing plate 63 slides within the depth of the concave portion 64*a* and slides on a plane perpendicular to the optical axis 5*a*. The concave portion 64*a* is formed in the spacer 64 and the stop-changing plate 63 is adapted to be swingable between the concave portion 64*a* and the rear surface of the front lens 60. The front lens 60 is the meniscus lens, the object side of which is the convex lens. Thus, it is prevented to contact the rear surface thereof with the stop-changing plate 63 so that the lens surface is not damaged.

An arm portion of the stop-changing plate 63, which extends from a curving portion 63*e* to the end portion 63*a*, is formed so as to have an arc shape, a center of which coincides with a rotational axis of the stop-changing plate 63. In virtue of this, the space of the gap 64*d* may be reduced. Incidentally, the open side of the opening 64*b* is formed with projections 64*e* and 64*f* projecting toward the inside. The projections 64*e* and 64*f* prevent the end portion 63*a* from dropping into the opening 64*b*.

Figure 16:
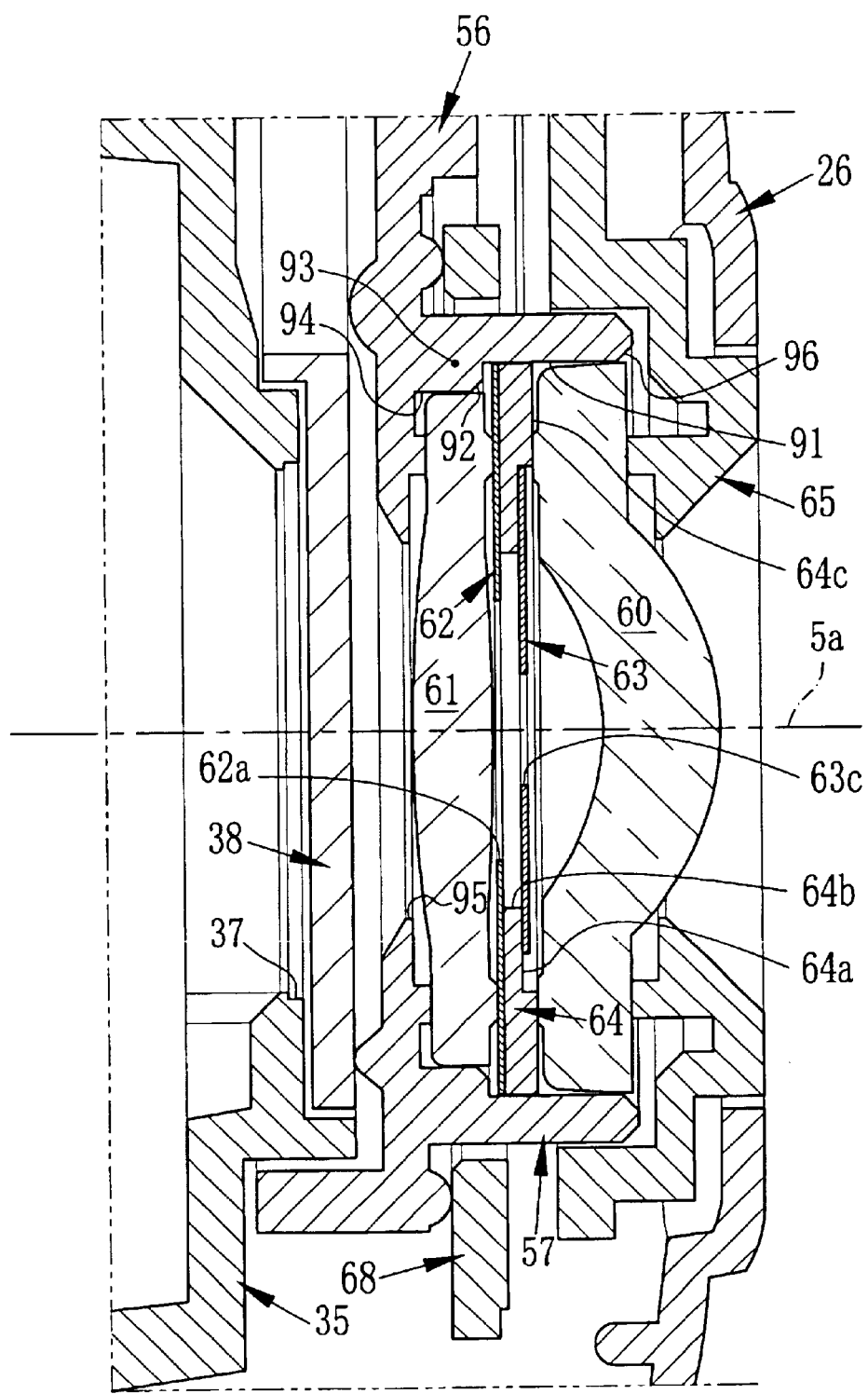
FIG. 16 is a section view partially showing a surrounding portion of a taking lens.

In general, at a periphery of the lens, a burr occurs along a parting line of a mold. Meanwhile, as shown in FIG. 16, it is necessary to form the inside of the lens barrel 57 deeply for the purpose of inserting the two lenses 60 and 61. Such a deep cavity causes disadvantages that separation in a molding process deteriorates and scuffing flaws occur. In view of this, the lenses 60 and 61 are adapted to have different diameters.

The inside of the lens barrel 57 is formed with a smaller opening 94 and a larger opening 91. The smaller opening 94 is adjusted to the diameter of the rear lens 61. The larger opening 91 is adjusted to the diameter of the front lens 60. In this embodiment, the mold is constituted so as to cause the burr at the front peripheries of the lenses 60 and 61. Further, tapers 92 and 96 are formed at open edges of the smaller opening 94 and the larger opening 91 respectively. The tapers 92 and 96 are formed for easily attaching the lenses 60 and 61, and for securing a space receiving the burr caused at the front peripheries of the lenses 60 and 61. Incidentally, reference numeral 95 denotes an exposure aperture formed at the bottom of the lens barrel 57. The stop plate 62 and the spacer 64 have a diameter fitting to the larger opening 91.

When the diameters of the front and rear lenses 60 and 61 have a great difference, a caliber difference between the smaller opening 94 and the larger opening 91 becomes large. Due to this, a thick portion 93 of the lens barrel 57 hardly has a uniform thickness. As to a portion where the thickness difference is small, fluidity of a resin deteriorates at the time of molding. As to a portion where the thickness difference is large, there is a disadvantage that shrinkage cavity occurs. By contrast, when the diameters of the front and rear lenses 60 and 61 have a small difference, it is impossible to form the tapers 92 and 96 to be utilized for absorbing the burr. In consideration of this, the diameter difference between the front and rear lenses 60 and 61 is preferable to be 0.2 to 0.5 mm, and more preferable to be 0.5 mm.

An operation of the above structure is described below. Incidentally, as to the operation identical with that of the first embodiment, description thereof is abbreviated.

In the diurnal photography mode, the changeover ring 68 is urged by the spring 70 and is kept in the initial position. When the changeover ring 68 is kept in the initial position, the end portion 63*a* of the stop-changing plate 63 enters the concave portion 64*a* to set the smaller stop 63*b* to the optical axis 5*a*. Further, the stop lever 49 is kept in the high-speed shutter position.

When setting the nocturnal synchronized-flash photography mode, the changeover ring 68 is rotated in the counter-clockwise direction. In association with this rotation, the stop-changing plate 63 is rotated to evacuate the smaller stop 63*b* from the optical axis 5*a*. Then, the end portion 63*a* stops, without slipping out of the concave portion 64*a*, at a position where the larger stop 62*a* is not covered. At this time, the end portion 63*a* stops in a state that the projections 64*e* and 64*f* come into contact therewith.

In this embodiment, is described the lens-fitted photo film unit including the stop-changing mechanism. However, a silver-salt camera, an electronic still camera and so forth may be applicable instead of the lens-fitted photo film unit. As to the taking lens, the two-lens structure is adopted. This structure, however, is not exclusive. The taking lens may be constituted of three or more lenses. In this case, the stop-changing plate may be inserted between the adjacent lenses.

Further, the stop is changed in association with the selective operation of the mode-changing member. Alternatively, a photometry mechanism may be provided to change the stop on the basis of subject brightness measured by the photometry mechanism.

Figure 17:
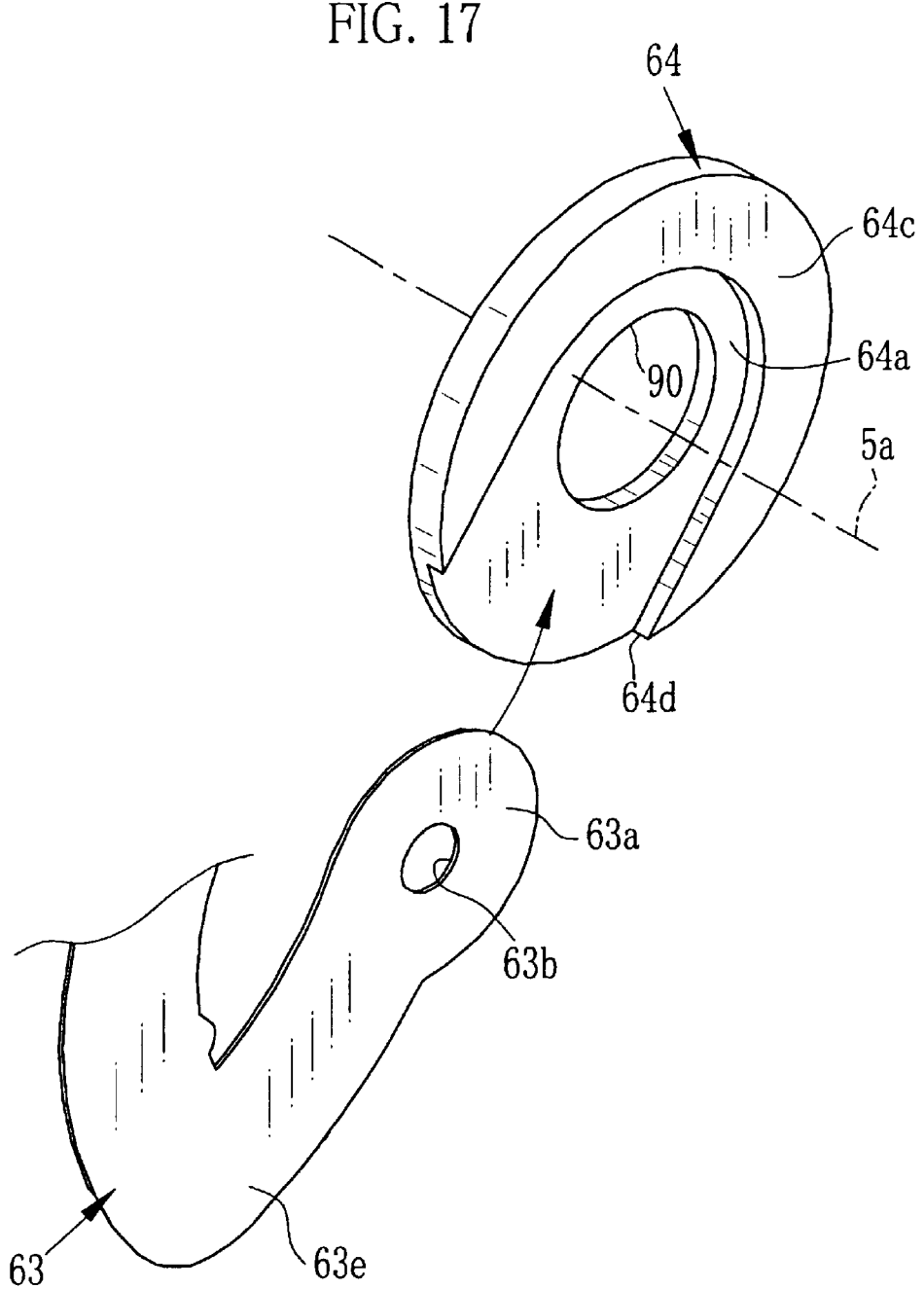
FIG. 17 is a perspective view showing another spacer in which an exposure aperture is formed.

Furthermore, the stop plate 62 may be omitted so as to maintain the interval of the lenses only by the spacer 64. FIG. 17 shows an embodiment in which a larger-stop plate and a spacer are unified. Such as shown in FIG. 17, the concave portion 64*a* of the spacer 64 maybe formed with a fixed stop 90 being as an exposure aperture. In this case, a number of parts may be reduced, and the smaller stop may be further approximated to the exposure aperture in the optical-axis direction.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit comprising:

a taking lens including at least a front lens and a rear lens;

a larger-stop plate provided with a larger stop and disposed at either of positions, one of which is between the front and rear lenses and the other of which is behind the rear lens;

a shutter blade being rotatable between a closed position where an exposure aperture is closed, and an open position where the exposure aperture is opened; and a stop-changing plate being rotatable between a smaller-stop position where a smaller stop is inserted into an interval of the front and rear lenses, and a larger-stop position where the smaller stop is evacuated from the interval of the front and rear lenses, wherein rotational centers of said shutter blade and said stop-changing plate are arranged in either state of coincidence and approximation, and a rotational direction of the shutter blade from the closed position to the open position is set to be identical with a rotational direction of the stop-changing plate from the smaller-stop position to the larger-stop position.

2. A lens-fitted photo film unit according to claim 1, further comprising:

a changeover ring attached to a periphery of a lens barrel containing said taking lens, said changeover ring rotating in accordance with a stop-changing operation to rotate said stop-changing plate between the smaller-stop position and the larger-stop position in association with a rotation of said changeover ring.

3. A lens-fitted photo film unit according to claim 2, further comprising:

a shutter-speed changing mechanism for changing a shutter speed by regulating a rotational range of said shutter blade, said shutter-speed changing mechanism changing the shutter speed in association with the rotation of the changeover ring.

4. A lens-fitted photo film unit according to claim 3, wherein said shutter-speed changing mechanism changes the shutter speed from high speed to low speed when said stop-changing plate is set from the larger-stop position to the smaller-stop position.

5. A lens-fitted photo film unit according to claim 4, further comprising:

a synchro switch pushed and curved by a part of said shutter blade when said shutter blade rotates from the closed position toward the open position, said synchro switch being kept in an ON-state while curving, wherein said shutter-speed changing mechanism changes a curve amount of said synchro switch, which is caused by said shutter blade, in two steps in order to set the shutter speed at the high speed and the low speed.

6. A lens-fitted photo film unit according to claim 5, wherein said shutter-speed changing mechanism includes a pad movable behind the synchro switch, said pad being positioned behind the synchro switch to decrease the curve amount of the synchro switch caused by the shutter blade when the shutter speed is the high speed, and said pad being evacuated from the back of the synchro switch to increase the curve amount of the synchro switch when the shutter speed is the low speed.

7. A lens-fitted photo film unit according to claim 6, further comprising:

a protrusion formed on the front of said lens-fitted photo film unit to contain said taking lens, said stop-changing plate being contained in said protrusion.

8. A lens-fitted photo film unit according to claim 4, wherein said stop-changing plate has a V-figure shape, and one end thereof is formed with the smaller stop.

9. A lens-fitted photo film unit according to claim 8, wherein the other end of said stop-changing plate is formed with an ellipse hole with which a link pin provided on said changeover ring engages.

10. A lens-fitted photo film unit according to claim 9, wherein said ellipse hole curves in an L-figure shape.

11. A lens-fitted photo film unit according to claim 4, wherein said lens barrel is provided with a cut portion through which said stop-changing plate rotates.

12. A lens-fitted photo film unit according to claim 11, further comprising:

a spacer disposed between the front and rear lenses to secure a rotational space of said stop-changing plate.

13. A lens-fitted photo film unit according to claim 12, wherein said spacer is formed with a fixed opening bigger than said larger stop of said larger-stop plate.

14. A lens-fitted photo film unit according to claim 13, wherein said spacer has a concave portion, a part of said stop-changing plate entering said concave portion when said stop-changing plate is set to the smaller-stop position.

15. A lens-fitted photo film unit according to claim 14, wherein said spacer is disposed in front of said larger-stop plate.

16. A lens-fitted photo film unit according to claim 15, wherein said fixed opening is formed at a central portion of said spacer.

17. A lens-fitted photo film unit according to claim 16, wherein said larger-stop plate and said spacer are unified.

* * * * *